United States Patent
Yang et al.

(10) Patent No.: US 9,906,287 B2
(45) Date of Patent: Feb. 27, 2018

(54) ANTENNA SELECTION IN COORDINATED MULTIPOINT COMMUNICATIONS

(71) Applicant: Nokia Solutions and Networks Oy, Espoo (FI)

(72) Inventors: Weidong Yang, Hoffman Estates, IL (US); Roy Yang, Buffalo Grove, IL (US); Yinyan Wang, Palatine, IL (US)

(73) Assignee: Provenance Asset Group LLC, Essex, CT (US)

( * ) Notice: Subject to any disclaimer, the term of this patent is extended or adjusted under 35 U.S.C. 154(b) by 54 days.

(21) Appl. No.: 14/766,514

(22) PCT Filed: Feb. 14, 2013

(86) PCT No.: PCT/US2013/026143
§ 371 (c)(1),
(2) Date: Aug. 7, 2015

(87) PCT Pub. No.: WO2014/126569
PCT Pub. Date: Aug. 21, 2014

(65) Prior Publication Data
US 2015/0365157 A1    Dec. 17, 2015

(51) Int. Cl.
*H04W 4/00* (2009.01)
*H04B 7/08* (2006.01)
(Continued)

(52) U.S. Cl.
CPC ........... *H04B 7/0811* (2013.01); *H04B 7/024* (2013.01); *H04B 7/0632* (2013.01); *H04B 7/0802* (2013.01); *H04W 74/006* (2013.01)

(58) Field of Classification Search
None
See application file for complete search history.

(56) References Cited

U.S. PATENT DOCUMENTS

2011/0096680 A1\* 4/2011 Lindoff ............... H04L 25/022
370/252
2011/0261711 A1\* 10/2011 Kronestedt .......... H04B 7/0608
370/252
(Continued)

FOREIGN PATENT DOCUMENTS

CN           101175271 A      5/2008
KR      10-2008-0067944      7/2008
(Continued)

OTHER PUBLICATIONS

ETSI TS 125 211 V11.1.0 (Sep. 2012), "Universal Mobile Telecommunications System (UMTS; Physical channels and mapping of transport channels onto physical channels (FDD)", 64 pgs.
(Continued)

*Primary Examiner* — Edan Orgad
*Assistant Examiner* — Rebecca Song
(74) *Attorney, Agent, or Firm* — Harrington & Smith

(57) ABSTRACT

An apparatus and method for antenna selection in uplink coordinated multipoint communications, where a plural number of geographically separated antennas are present, forming a plural number of cells. This apparatus and method relates to selecting a PRACH configuration, sharing information regarding the selected PRACH preamble amongst cells; an user equipment, upon receiving instruction from its serving cell, transmits a PRACH preamble. All cells, including serving cell, detects the selected PRACH preamble in the received PRACH transmission transmitted by the user equipment, determining pathloss information regarding the quality of the detected selected PRACH preamble, and selecting a set of cooperative multipoint antennas from the plural number of antennas based on the determined channel quality information for this user equipment. This apparatus and method is also applicable for antenna selection in the
(Continued)

case of a single cell with a plural number of geographically separated antennas.

12 Claims, 9 Drawing Sheets

(51) Int. Cl.
*H04B 7/024* (2017.01)
*H04B 7/06* (2006.01)
*H04W 74/00* (2009.01)

(56) References Cited

U.S. PATENT DOCUMENTS

| | | | |
|---|---|---|---|
| 2011/0317654 A1 | 12/2011 | Ishida et al. | 370/329 |
| 2012/0002643 A1 | 1/2012 | Chung et al. | |
| 2012/0320842 A1 | 12/2012 | Jeong et al. | 370/329 |
| 2013/0142054 A1* | 6/2013 | Ahmadi | H04B 7/024 |
| | | | 370/252 |
| 2014/0328309 A1* | 11/2014 | Comstock | H04W 72/082 |
| | | | 370/329 |
| 2015/0023283 A1* | 1/2015 | Liu | H04W 36/08 |
| | | | 370/329 |

FOREIGN PATENT DOCUMENTS

| | | |
|---|---|---|
| WO | WO 2010/124228 A2 | 10/2010 |
| WO | WO 2011/074865 A2 | 6/2011 |

OTHER PUBLICATIONS

ETSI TS 125 214 V11.3.0 (Sep. 2012), "Universal Mobile Telecommunications System (UMTS); Physical layer procedures (FDD)", 115 pgs.
ETSI 125 331 V11.3.0 (Nov. 2012), "Universal Mobile Telecommunications System (UMTS); Radio Resource Control (RRC); Protocol specification (3GPP TS 25.331 version 11.3.0 Release 11)", 1981.
Masson, Romain, "E-UTRA RACH within the LTE system", XR-EE-KT 2006:002, Stockholm, Sweden, Feb. 3, 2006, 84 pgs.

* cited by examiner

```
RACH-ConfigCommon ::=            SEQUENCE {
    preambleInfo
        numberOfRA-Preambles         SEQUENCE {
                                         ENUMERATED {
                                             n4, n8, n12, n16, n20, n24, n28,
                                             n32, n36, n40, n44, n48, n52, n56, n60, n64},
        preamblesGroupAConfig            SEQUENCE {
            sizeOfRA-PreamblesGroupA         ENUMERATED {
                                                 n4, n8, n12, n16, n20, n24, n28,
                                                 n32, n36, n40, n44, n48, n52, n56, n60},
            messageSizeGroupA                ENUMERATED {b56, b144, b208, b256},
            messagePowerOffsetGroupB         ENUMERATED {
                                                 minusinfinity, dB0, dB5, dB8, dB10, dB12, dB15, dB18},
            ...                          OPTIONAL       -- Need OP
        },
    powerRampingParameters           SEQUENCE {
        powerRampingStep                 ENUMERATED {dB0, dB2, dB4, dB6},
        preambleInitialReceivedTargetPower ENUMERATED {
                                             dBm-120, dBm-118, dBm-116, dBm-114, dBm-112,
                                             dBm-110, dm-108, dBm-106, dBm-104, dBm-102,
                                             dBm-100, dBm-98, dBm-96, dBm-94, dBm-92, dBm-90}
    },
    ra-SupervisionInfo               SEQUENCE {
        preambleTransMax                 ENUMERATED {
                                             n3, n4, n5, n6, n7, n8, n10, n20, n50, n100, n200},
        ra-ResponseWindowSize            ENUMERATED {
                                             sf2, sf3, sf4, sf5, sf6, sf7, sf8, sf10},
        mac-ContentionResolutionTimer    ENUMERATED {
                                             sf8, sf16, sf24, sf32, sf40, sf48, sf56, sf64}
    },
    maxHARQ-Msg3Tx                   INTEGER (1..8),
    ...
}
```

FIG.4

| PREAMBLE FORMAT | $T_{CP}$ | $T_{SEQ}$ | GUARD PERIOD |
|---|---|---|---|
| 0 | $3168 \cdot T_S$ | $24576 \cdot T_S$ | $2976 \cdot T_S$ |
| 1 | $21024 \cdot T_S$ | $24576 \cdot T_S$ | $15840 \cdot T_S$ |
| 2 | $6240 \cdot T_S$ | $2 \cdot 24576 \cdot T_S$ | $6048 \cdot T_S$ |
| 3 | $21024 \cdot T_S$ | $2 \cdot 24576 \cdot T_S$ | $21984 \cdot T_S$ |
| 4 | $448 \cdot T_S$ | $4096 \cdot T_S$ | $288 \cdot T_S$ |

```
-- ASN1START

PRACH-ConfigSIB ::=         SEQUENCE {
    rootSequenceIndex           INTEGER (0..837),
    prach-ConfigInfo            PRACH-ConfigInfo
~~
PRACH-Config ::=            SEQUENCE {
    rootSequenceIndex           INTEGER (0..837),
    prach-ConfigInfo            PRACH-ConfigInfo                    OPTIONAL  -- Need ON
~~
PRACH-ConfigSCell-r10 ::=   SEQUENCE {
    prach-ConfigIndex-r10       INTEGER (0..63)
~~
PRACH-ConfigInfo ::=        SEQUENCE {
    prach-ConfigIndex           INTEGER (0..63),
    highSpeedFlag               BOOLEAN,
    zeroCorrelationZoneConfig   INTEGER (0..15),
    prach-FreqOffset            INTEGER (0..94)
~~
-- ASN1STOP
```

ANTENNA SELECTION IN COORDINATED MULTIPOINT COMMUNICATIONS

FIELD

The exemplary and non-limiting embodiments relate generally to wireless communication systems, methods, devices and computer programs and, more particularly, to antenna selection in uplink coordinated multipoint (CoMP).

BACKGROUND

Various abbreviations that appear in the specification and/or in the drawing figures are defined as follows:

3GPP™ third generation partnership project
AI/AICH acquisition indicator/acquisition indicator channel
CQI channel quality information
PCQI PRACH channel quality information
DL downlink
EUTRAN evolved UTRAN (also referred to as LTE™ or 3.9G)
GSM global system for mobile telecommunications
LTE™ long term evolution
MME mobility management entity
Node B/eNB base station
PC power control
PUSCH physical uplink shared channel
PRACH physical random access channel
RACH random access channel
SNR signal-to-noise ratio
UE user equipment
UL uplink
UTRAN universal terrestrial radio access network
WCDMA wideband code division multiple access

SUMMARY

The following summary is merely intended to be exemplary. The summary is not intended to limit the scope of the claims.

Various aspects of examples of the invention are set out in the claims.

According to a first aspect of the present invention, a method for antenna selection includes communicating information regarding an antenna selection physical random access channel (PRACH) configuration of a base station, including a selected PRACH preamble, to at least one neighboring base station; detecting the selected PRACH preamble transmitted by the user equipment corresponding to the transmitted information regarding the selected PRACH preamble at an antenna of the base station; determining channel quality information regarding a quality of the detected selected PRACH preamble; and selecting at least one cooperative multipoint antenna from a set of antennas including the antenna of the base station, based on the determined channel quality information. Stated another way, the serving cell of the user equipment (UE) may determine an appropriate PRACH configuration, broadcast the PRACH configuration with the neighboring cells. The user equipment may transmit the PRACH preamble according to PDCCH order sent by the serving cell. All cells (the serving cell and the neighboring cells) may detect the preamble from all antennas they support, and send the path loss information, per antenna, to a central location for subsequent antenna selection.

An exemplary apparatus includes one or more processors and one or more memories including computer program code. The one or more memories and the computer program code are configured to, with the one or more processors, cause the apparatus to perform at least the following: communicating information regarding an antenna selection physical random access channel (PRACH) configuration of a base station, including a selected PRACH preamble; receiving information regarding an antenna selection PRACH configuration of at least one neighboring base station; transmitting information regarding the selected PRACH preamble; detecting the selected PRACH preamble transmitted by the user equipment corresponding to the transmitted information regarding the selected PRACH preamble at an antenna of the base station; determining channel quality information regarding a quality of the detected selected PRACH preamble; and selecting at least one cooperative multipoint antenna from a set of antennas including the antenna of the base station, based on the determined channel quality information. The exchange of information among eNBs is through an inter-eNB link, which may or may not be carried through a wireless medium: e.g. through fiber, copperline, microwave link (in this case it is indeed carried "wirelessly").

An exemplary computer program product includes a computer-readable medium bearing computer program code embodied therein for use with a computer. The computer program code includes: communicating information regarding an antenna selection physical random access channel (PRACH) configuration of a base station, including a selected PRACH preamble; receiving information regarding an antenna selection PRACH configuration of at least one neighboring base station; detecting the selected PRACH preamble transmitted by the user equipment corresponding to the selected PRACH preamble at an antenna of the base station; and communicating channel quality information regarding a quality of the detected selected PRACH preamble.

BRIEF DESCRIPTION OF THE DRAWINGS

The foregoing aspects and other features are explained in the following description, taken in connection with the accompanying drawings, wherein:

FIG. 4 is a table illustrating an example data structure in Extended Backus-Naur form.

FIG. 9 is a diagram illustrating PRACH-Config information elements.

DESCRIPTION OF EMBODIMENTS

Figure 1:
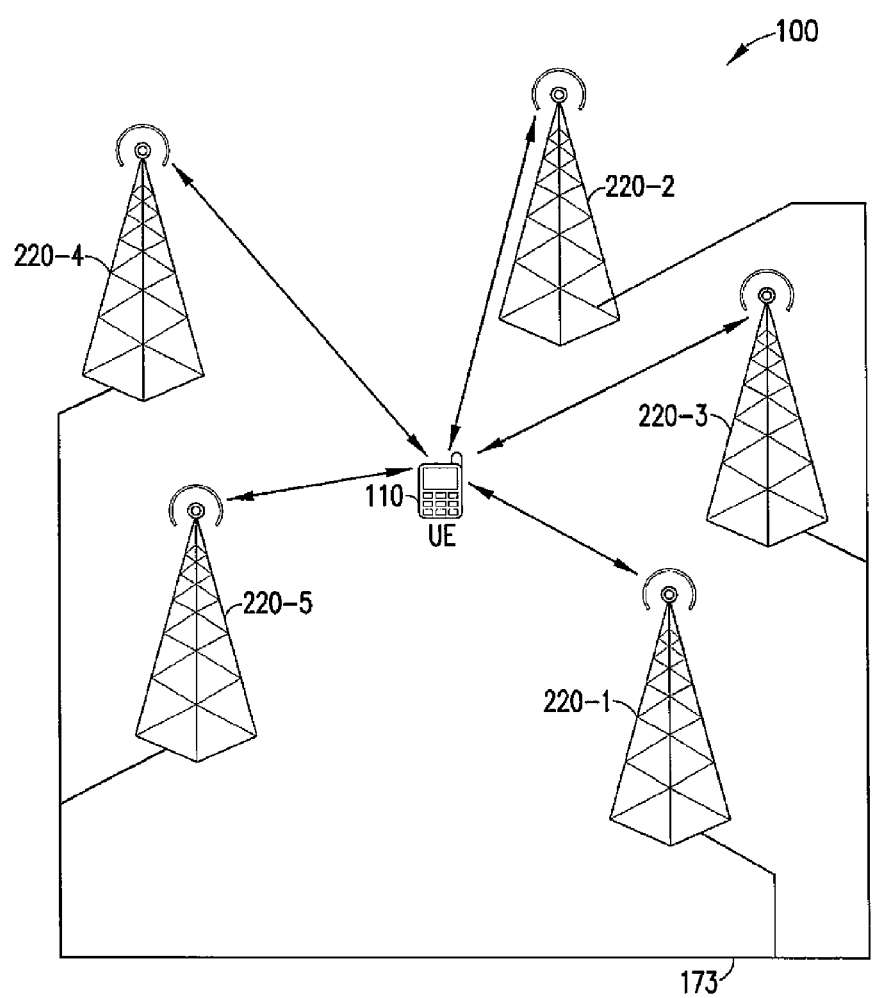
FIG. 1 is a diagram illustrating an example wireless telecommunication network.

Referring to FIG. 1, there is shown a diagram of a radio network 100 incorporating features of an example embodiment. Although the features will be described with reference to the example embodiment shown in the drawings, it should be understood that features can be embodied in many alternate forms of embodiments. In addition, any suitable size, shape or type of elements or materials could be used.

In FIG. 1, a radio network 100 such as, for example, a mobile telephone and data communication network based on the Long-Term Evolution (LTE™) standard published by the 3rd Generation Partnership Project (3GPP™), includes a user equipment 110 (such as—but not limited to—a mobile phone, smart phone, wireless modem, mobile hotspot, laptop computer or the like) in wireless communication with a serving base station 220-1. Neighboring base stations, such as 220-2 through 220-5, may also be provided in the vicinity of the serving base station 220-1.

Figure 3:
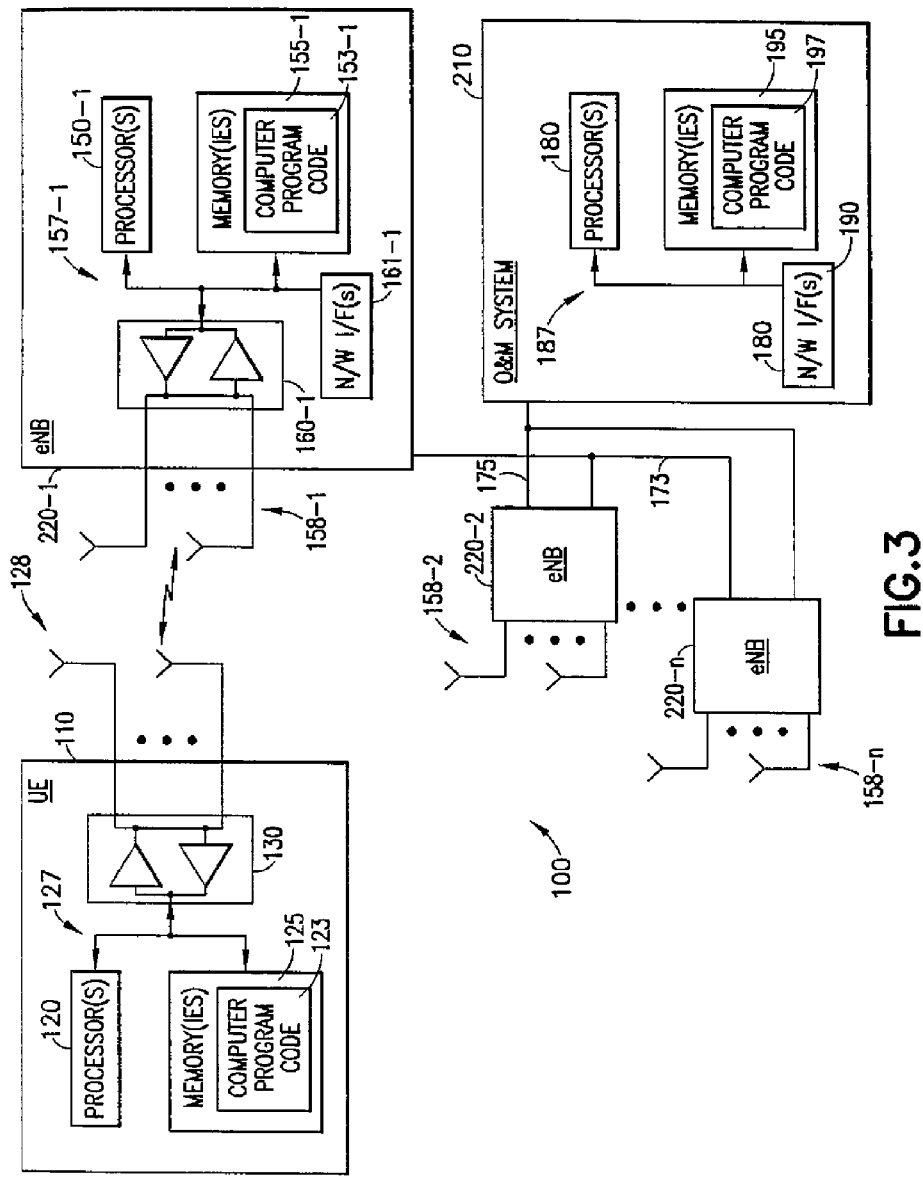
FIG. 3 illustrates a system in which the exemplary embodiments of the instant invention may be practiced.

FIG. 3 illustrates an exemplary system in which exemplary embodiments may be practiced. In FIG. 3, user equipment (UE) 110 is in wireless communication with a radio network 100. The user equipment 110 includes one or more processors 120, one or more memories 125, and one or more transceivers 130 interconnected through one or more buses 127. The one or more transceivers 130 are connected to one or more antennas 128, and may be either a single unit including unified hardware capable of both transmission and reception functionality, or alternatively, have separate hardware for performing each function. The one or more memories 125 include computer program code 123. The one or more memories 125 and the computer program code 123 are configured to, with the one or more processors 120, cause the user equipment 110 to perform one or more of the operations as described herein.

The radio network 100 may include n number of base stations, also referred to as "eNodeBs" (eNBs), 220-1, 220-2, . . . 220-n, and operations and maintenance (O&M) system 210. It is noted that O&M is also called operations, administration, and maintenance (OA&M), operations and support (O&S), and/or operations, administration, maintenance and provisioning (OAM&P), inter alia.

In a non-limiting example, the number of base stations may selected to be 5 (i.e., n=5), as illustrated in FIGS. 1 and 2, inter alia. The internal elements of base station 220-1 will be described herein, and it is assumed the base stations 220-2 and 220-n are similar. The base station 220-1 includes one or more processors 150-1, one or more memories 155-1, one or more network interfaces (N/W I/F(s)) 161-1, and one or more transceivers 160-1 interconnected through one or more buses 157-1. The one or more transceivers 160-1 are connected to one or more antennas 158-1. The one or more memories 155-1 include computer program code 153-1. The one or more memories 155-1 and the computer program code 153-1 are configured to, with the one or more processors 150-1, cause the base station 220-1 to perform one or more of the operations as described herein. The one or more network interfaces 161-1 communicate over networks such as the networks 173, 175.

The O&M system 210 of at least one non-limiting example embodiment includes one or more processors 180, one or more memories 195, and one or more network interfaces (N/W I/F(s)) 190 interconnected through one or more buses 187. The one or more memories 195 include computer program code 197. The one or more memories 195 and the computer program code 197 are configured to, with the one or more processors 180, cause the O&M system 210 to perform one or more of the operations as described herein. The one or more network interfaces 190 communicate over networks such as the networks 173, 175.

The base stations 220 communicate using, e.g., a network 173. The network 173 may be wired, wireless, or both, and may implement, e.g., an X2 interface. Another network 175 may be wired or wireless or both and may implement. The O&M system 210 uses the network 175 to communicate with the base stations 220. One or both networks 173, 175 may provide a "backhaul" communication channel or core network connectivity, or a combination of both, enabling communication among all or at least a subset of the base stations 220 and to other networks such as, inter alia, the public switched telephone network (PSTN), a private content distribution service (e.g., an online music, video and application marketplace), other portions of the mobile operator's core network, and/or the Internet. The networks 173, 175 may be implemented using suitable switched or packet-based data communications links such as PDH or SDH/SONET (e.g., E1/T1 or fractional E1/T1, E3, T3, STM-1/OC-3, etc.), DSL or DSL variants (e.g., ADSL, SDSL, SHDSL, etc.), ethernet, coaxial cable or other waveguide type link, fibre optic link, etc. Alternatively, in another non-limiting example, the networks 173, 175 may include a wireless communication medium such as a microwave, radio-frequency (such as WiFi, WiMax, or an additional LTE™ connection), or free-space optical (visible light, infrared or ultraviolet spectrum) link.

Figure 2A:
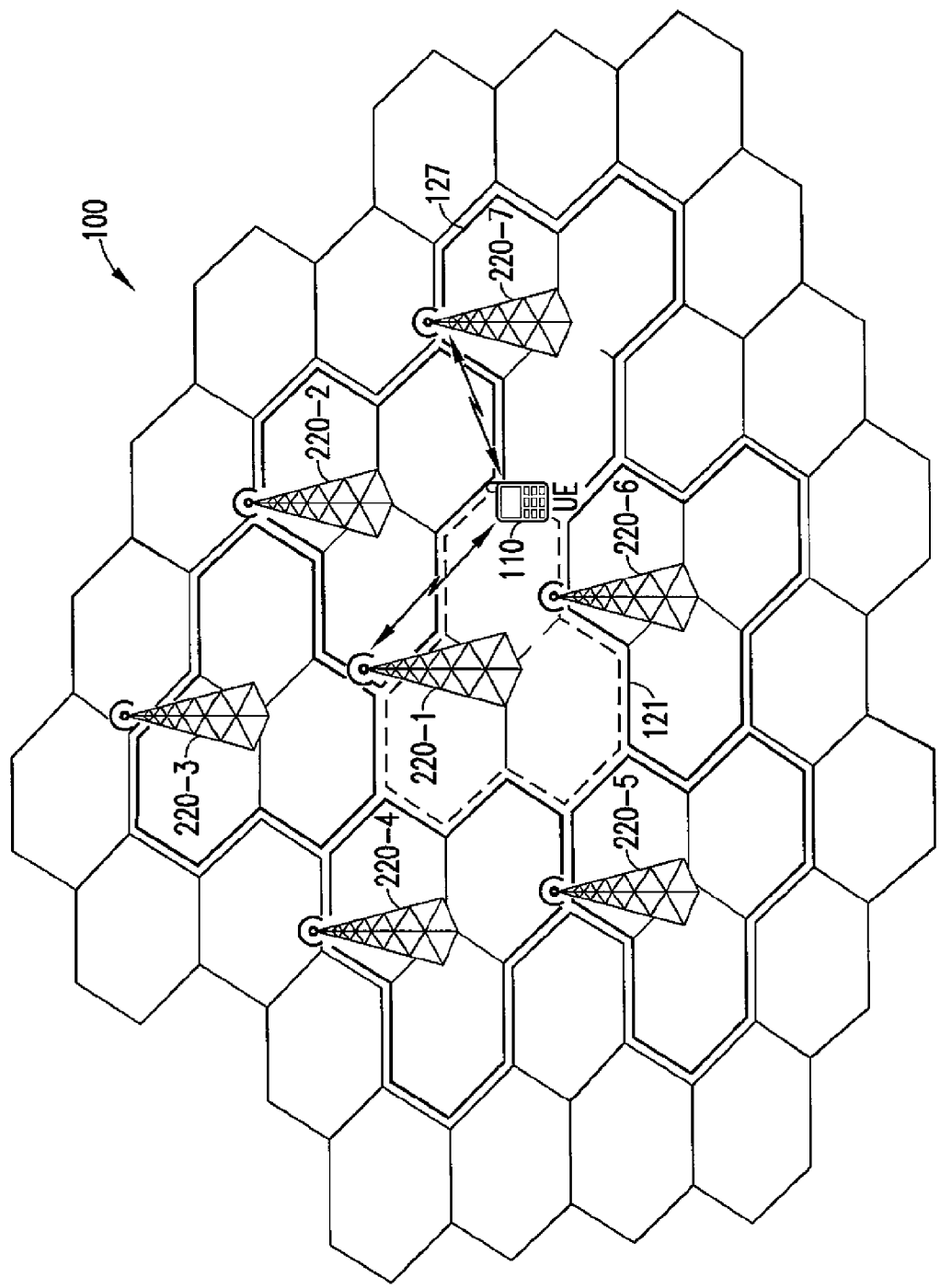
FIG. 2A illustrates an example wireless telecommunication network at the intersection of several cells.

As illustrated in FIGS. 1 and 2A, multiple neighboring base stations (e.g., 220-2 through 220-5) may be positioned closely enough that their respective radio transmissions cause mutual interference. Radio interference between base stations tends to reduce bandwidth and reliability of transmissions, and therefore reduces the quality of communication provided to user equipment 110. In order to maximize data transfer rates and increase the bandwidth provided to the user equipment 110, the cooperative use of multiple antennas is employed, in which a user equipment 110 communicates with multiple base station antennas. In an exemplary embodiment, a set of cooperative multipoint antennas are selected from among base station antennas within communicative range of a user equipment 110. The set of cooperative multipoint antennas may be selected to optimize the quality of communication with the user equipment 110. In this non-limiting example, the user equipment 110 transmits data to the selected set of cooperative multipoint antennas in accordance with an uplink cooperative multipoint (also referred to as "uplink CoMP") approach.

In uplink CoMP, uplink transmissions from the user equipment 110 is received at multiple geographically separated antennas. In a non-limiting exemplary embodiment, the set of cooperative multipoint antennas are selected from among two or more base stations 220 in a vicinity of the user equipment 110, as illustrated in FIG. 2A. As shown in the non-limiting example of FIG. 1, a signal from the user equipment 110 is received at base stations 220-1 through 220-5. By pooling the signals received at the antennas of the multiple base stations 220-1 through 220-5 in accordance with joint reception techniques, it is possible to take advantage of macro diversity and to exploit the interference and enhance throughput to the user equipment 110, especially at the cell edge. FIG. 2A shows, as another non-limiting example, the user equipment 110 at the edge of cell 121 (belonging to serving base station 220-1) and cell 127 (belonging to a neighboring base station 220-7), transmitting and receiving signals both with the serving base station 220-1 and with the neighboring base station 220-7.

Figure 2B:
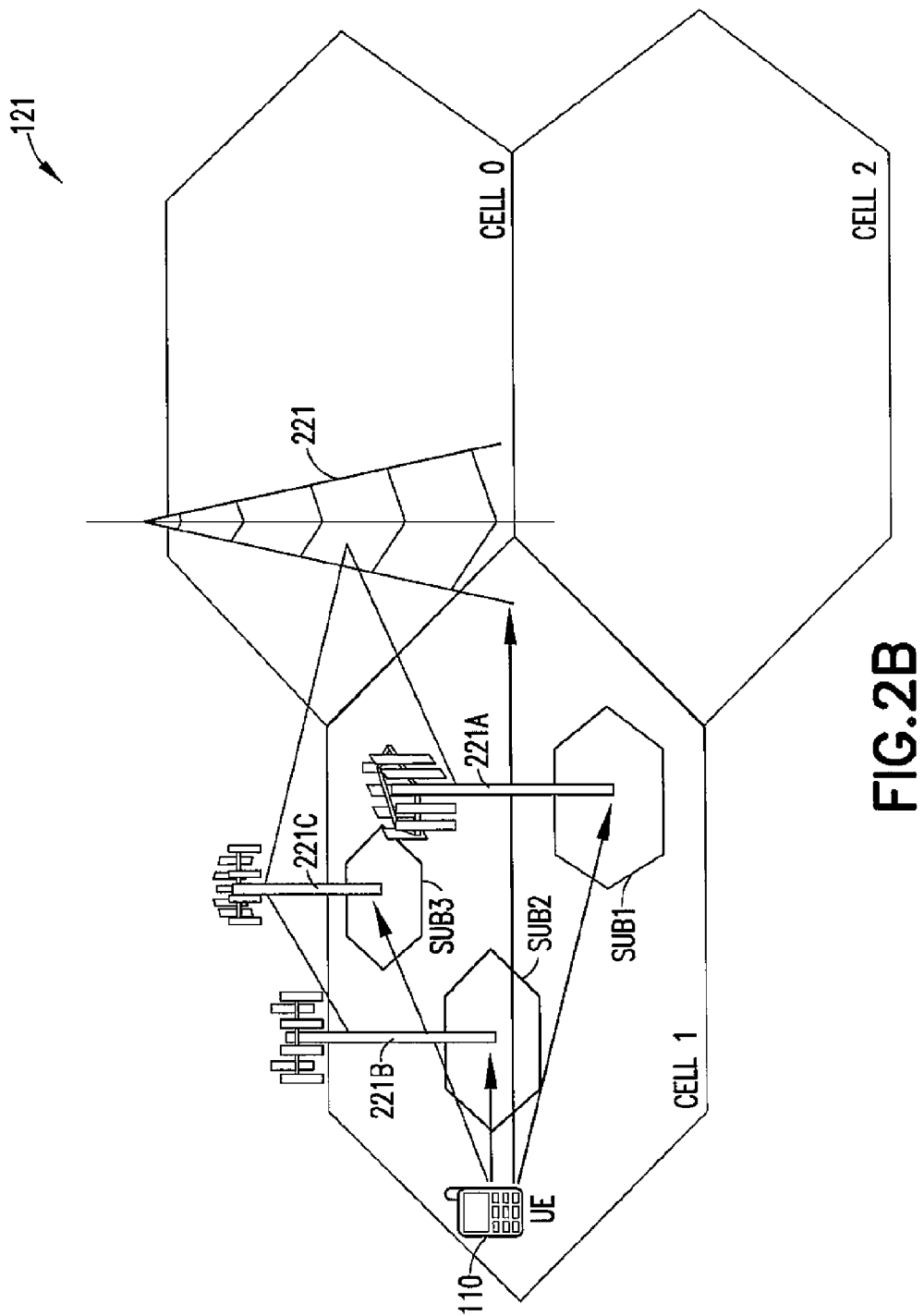
FIG. 2B illustrates an example wireless telecommunication site in which a distributed base station includes multiple remote antennas.

In another non-limiting exemplary embodiment, as shown in FIG. 2B, the set of cooperative multipoint antennas are selected from among two or more antennas 221A, 221B, 221C and/or the antenna of the distributed base station itself 221 in one or more cells (cell 0, cell 1 or cell 2) or sub-cells (sub 1, sub 2 or sub 3) of a site or macro-cell 121 of a distributed base station 221. The selected cooperative multipoint antennas may include auxiliary or remote antennas (221A, 221B and 221C) within sub-cells (sub 1, sub 2 or sub 3) in a cell of a distributed base station 221, such as cell 1 in FIG. 2B. In another example, the selected set of cooperative multipoint antennas may also include antennas of one or more neighboring base stations 220.

The set of cooperative multipoint antennas are selected from among the available base station antennas based on information regarding the quality of the channel of communication between the user equipment 110 and the one or more antennas of the base stations 220, also referred to as "PRACH channel quality information" (PCQI) or "PRACH CQI". As non-limiting examples, the PCQI may include the instantaneous signal-to-noise ratio (SNR) of a physical uplink shared channel (PUSCH) transmission; a reference signal received power (RSRP) value; and/or a sounding reference signal (SRS). The PCQI for each antenna is computed separately, even at the same cell. When the PCQI for two or more base station antennas are determined, the set of cooperative multipoint antennas can be selected by, for example, ranking the PCQI values and selecting the base station antennas corresponding to the highest n PCQI values. Alternatively, as another non-limiting example, the set of cooperative multipoint antennas can be selected by including one or more base station antennas having a PCQI value greater then a minimum threshold value, or any other suitable technique for evaluating and/or selecting cooperative multipoint antennas, inter alia.

In accordance with various wireless telecommunication protocols, such as the Long Term Evolution (LTE™) standard published by the 3rd Generation Partnership Project (3GPP™), a random access procedure (RAP) is defined for communication between user equipment 110 and wireless network nodes (e.g., base stations 220). By using the random access procedure, user equipment 110 can synchronize uplink transmission with the wireless network 100. In one non-limiting example, the LTE™ standard includes a contention-based random access channel (RACH) enabling user equipment 110 to establish initial uplink to a base station 220 of a wireless telecommunication network 100. In addition to establishing uplink communication, the user equipment 110 may send RACH transmissions for other purposes. This can be carried with non-contention based RACH. In this case, a UE may be assigned a PRACH preamble by the eNB through PDCCH (called PDCCH order in LTE). The UE may use the assigned PRACH preamble (called dedicated preamble in LTE) in the transmission to the eNB, so the eNB has full knowledge on which UE is transmitting with which PRACH preamble at a specific time. The PRACH preamble pool for the dedicated RACH is different from the PRACH preamble pool for non-dedicated RACH.

In contrast, in contention based RACH (non-dedicated RACH), as the UE needs to randomly pick a PRACH preamble out of a PRACH preamble pool, there is uncertainty on which PRACH preamble is used. Also, there is a possibility multiple UEs may perform the RACH procedure at the same time, which lead them to choose the same ox different PRACH preamble(s) from the PRACH preamble pool for contention based RACH.

The RACH transmissions by the user equipment 110 may collide with transmissions sent by other user equipment units. These collisions may be resolved or mitigated by random back-off or other suitable methods.

In a non-limiting example, a user equipment 110 gains access to the RACH and signals a serving base station 220-1 to establish uplink communication. The base station 220-1 may optimize uplink communication with the user equipment 110 by arranging for one or more transmissions from the user equipment 110 to be received by multiple base station antennas, such as by using uplink CoMP, as discussed above. The serving base station 220-1 then determines the set of base station antennas to be used in uplink CoMP.

As part of the process of selecting a suitable set of cooperative multipoint antennas, the serving base station 220-1 transmits information to one or more neighboring base stations (e.g., base stations 220-1 through 220-5 as shown in FIG. 1 or base stations 220-1 through 220-7 in FIG. 2A) regarding at least one PRACH preamble that will be transmitted by the user equipment 110. In accordance with a non-limiting example, FIG. 4 shows an information element (IE) titled "RACH-ConfigCommon" that includes information ("preambleInfo") regarding the number of PRACH preambles ("numberOfRA-Preambles") and additional attributes (e.g., "messageSizeGroupA", "messagePowerOffsetGroupB") that will be wirelessly transmitted by the user equipment 110. Concerning the generation of each PRACH waveform, in LTE, PRACH-Config information elements (refer to FIG. 9 for example) specify the root sequence index, and PRACH-ConfigIndex (the subframe(s) where a PRACH is allowed to be transmitted), the cyclic prefix and the high speed flag, and the frequency location of the PRACH waveform. In FIG. 9, highSpeedFlag is for the parameter High-speed-flag, prach-ConfigIndex is for the parameter prach-ConfigurationIndex, prach-FreqOffset is for the parameter prach-FrequencyOffset, rootSequenceIndex is for the parameter RACH_ROOT_SEQUENCE, and zeroCorrelationZoneConfig is for the parameter $N_{cs}$ configuration.

In a typical LTE system, information embedded in the IE RACH-ConfigCommon and PRACH-Config is broadcast by the eNB in the downlink and UEs, such as the user equipment 110, in the cell receive the broadcast information. They can also be provided to a UE as part of the "MobilitycontrolInfo" IE with dedicated signaling. In contrast, in one type of example comprising features as described herein, the information embedded in the IE RACH-ConfigCommon and PRACH-Config may also be communicated from the serving cell to neighboring cells. This allows neighboring cells to know un-equivocally how PRACH signals for the serving cells are generated, when the serving cell needs to detect possible PRACH transmission from the UE, and where to detect it. In summary, the information necessary to configure a PRACH detector at the serving cell may be replicated to the neighboring cells. The signaling details may be different in Carrier aggregation, but a similar procedure may be applied.

Figures 5, 6:
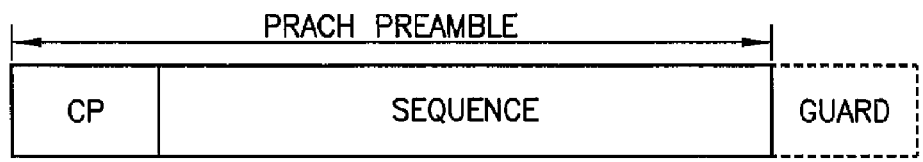
FIG. 5 is a diagram illustrating an example PRACH preamble.
FIG. 6 is a table illustrating properties of an example set of PRACH preambles.

In one non-limiting example, as shown in FIG. 5, a RACH transmission includes a physical random access channel (PRACH) preamble, followed by a guard period. The PRACH preamble includes a cyclic prefix (CP) followed by a sequence of data. The guard period following the PRACH preamble mitigates timing uncertainty caused by the distance between the user equipment 110 and the serving base station 220-1, and the length of the guard period correlates to the radius of the cell. The RACH transmission power also correlates with the length of the guard period.

In a non-limiting exemplary embodiment the eNB broadcasts the RACH configuration information; which is used by UEs to derive the transmit parameters for both dedicated and non-dedicated RACH. This information is typically acquired when a UE attaches to a network (i.e. enters the network) by reading the broadcast channel. If an eNB gives a PDCCH order to a UE, then the UE follows the PDCCH order to transmit the dedicated RACH. A UE uses two parts of information to perform dedicated RACH: one from the eNB broadcast (from RACH-ConfigCommon and PRACH-Config), and another from the PDCCH order. As illustrated in FIGS. 2A, 4 and 5, the serving base station 220-1 transmits a PDCCH order to the user equipment 110, in which the resource configuration information causes the user equipment 110 to transmit a PRACH preamble having a transmission power and/or length of transmission time sufficient for an antenna of at least one neighboring base station 220-7 to receive the PRACH preamble. When additional neighboring base stations (such as 220-2 and 220-6 in FIG. 2A) are present in the vicinity of the serving base station 220-1, the serving base station 220-1 may configure its RACH resource configuration information (RACH-ConfigCommon) to cause UEs, such as the user equipment 110, to transmit the PRACH preamble having increased transmission power and/or length of transmission time sufficient to reach the additional neighboring base stations (220-2, 220-6) also.

In another non-limiting exemplary embodiment, as illustrated in FIGS. 2B, 4 and 5, the serving base station 220-1 configures RACH-ConfigCommon to the user equipment 110, in which the resource configuration information causes the user equipment 110 to transmit a PRACH preamble having a transmission power or length of transmission time sufficient for at least two geographically separate antennas (e.g., any two or more antennas from the set of antennas comprising the distributed base station itself 221 and the remote radio antennas 221A, 221B and 221C) of a distributed base station 221 to receive the PRACH preamble.

The format of the PRACH preamble may be selected from among a defined set of preamble formats. As shown in FIG. 6, as a non-limiting example, the set of preamble formats may include five formats, numbered 0 through 4, each corresponding to a different length of guard period (and size of geographical cell radius).

The PRACH preamble format may include a physical random access channel (PRACH) format. The format of the PRACH preamble may be selected from a defined set of preamble formats. As shown in FIG. 6, as a non-limiting example, the set of preamble formats may include five preamble formats, numbered 0 through 4, each corresponding to a different length of guard period (and size of geographical cell radius). Each preamble format has a respective corresponding cyclic prefix duration ($T_{CP}$), sequence duration ($T_{SEQ}$), and guard period duration, which may be defined as coefficients multiplied by the system sampling period ($T_S$), in which $T_S$ has an established value (e.g., in LTE™, $T_S=1/30.72$ μs, as a non-limiting example).

In accordance with a non-limiting exemplary embodiment, the serving base station 220-1 selects the PRACH preamble format based on distance and pathloss from UE 110 to the serving base station 220-1 and one or more neighboring base stations 220-2 through 220-7, to ensure the user equipment 110 transmits the PRACH preamble with sufficient power for the transmission to be received at the neighboring base stations and there is no timing ambiguity on the PRACH. As illustrated in FIG. 2A, for example, when the distance between serving base station 220-1 and neighboring base station 220-7 is 500 meters, based on the LTE™ standard, PRACH format 0 may be adequate from a timing ambiguity point of view; however, to ensure reception at the neighboring base station 220-7, the serving base station 220-1 may nonetheless select PRACH format 2 instead of PRACH format 0. Also, the power ramping configuration may be selected to ensure reception at one or more neighboring base stations. In a non-limiting example, the selection of the PRACH preamble format conforms to an established wireless standard (such as LTE™ rel. 9 or 10, inter alia) despite the increased transmission power of the selected PRACH preamble, and does not require modification of or departure from the established wireless standard.

In another non-limiting exemplary embodiment, each of the serving cell 220-1 and participating neighboring cells 220-2, 220-6, 220-7 communicate their respective PRACH configuration to each other. As shown in FIG. 4, as a non-limiting example, each base station exchanges an information element including "RACH-ConfigCommon" and "PRACH-Config" data to the other base stations, which contains the data field "numberOfRA-Preambles," inter alia.

According to another non-limiting exemplary embodiment, the base station 220-1 and relevant neighboring base stations 220-2, 220-6, 220-7 coordinate the configuration of PRACH resources such as time, frequency and PRACH preamble index. The coordination among base stations may distribute the additional signal processing load among base station field-programmable gate array (FPGA) and/or digital signal processor (DSP) units such that the impact on peak processing (e.g., as measured in millions of instructions per second (MIPS)) or other resource requirements are minimized, reduced or mitigated.

The user equipment 110 receives the PRACH preamble information transmitted by the serving base station 220-1. The user equipment 110 then either spontaneously, or upon further receiving a physical downlink control channel (PDCCH) signal, transmits a corresponding PRACH preamble. The PRACH preamble transmitted by the user equipment 110 may then be received by both the neighboring base station 220-7 and the serving base station 220-1, as shown in FIG. 2A. In the non-limiting example of FIG. 2B, the PRACH preamble may then be received and recognized by two or more remote antennas 220A, 220B or 220C. In still another non-limiting example, as illustrated in FIG. 1, the PRACH preamble may be received at the serving base station 220-1 and each of neighboring base stations 220-2, 220-3, 220-4 and 220-5.

The one or more neighboring base stations (e.g., 220-7, 220-6, 220-2 in FIG. 2A) then communicate information regarding the quality of the PRACH preamble (PCQI), as respectively received, to the serving base station 220-1 via the backhaul network 173 or 175. For example, the neighboring base station 220-7 may receive the transmitted PRACH preamble with a SNR value of 7.2 dB; the neighboring base station 220-2 may receive the transmitted PRACH preamble with a SNR value of 2.4 dB; the neighboring base station 220-6 may receive the transmitted PRACH preamble with a SNR value of 0.7 dB; and the serving base station 220-1 may receive the transmitted PRACH preamble with a SNR value of 11.2 dB. In the non-limiting example shown in FIG. 2A, the neighboring base stations 220-2, 220-6 and 220-7 communicate PCQI (in this case, the SNR values) of the PRACH preamble (transmitted from the user equipment 110) to the serving base station 220-1 using, for example, a fiber optic interconnection 173.

In another embodiment, as exemplified in FIG. 2B, the distributed base station 221 determines similar PCQI for each remote antenna branch 221A, 221B and 221C.

According to another exemplary embodiment, the serving base station 220-1 and neighboring base stations 220-2, 220-6 and 220-7 (or the distributed base station 221 and remote antenna branches 221A, 221B, 221C) ascertain PCQI including the power profile of the respectively received PRACH preamble.

The serving base station 220-1 and relevant neighboring base stations 220-2, 220-6, 220-7 can exchange information regarding the PDCCH signal sent to the user equipment 110 in order to improve the estimated PCQI. The large processing gain of PRACH can be exploited to detect multiple preambles from different user equipment 110 at the same time. In an exemplary embodiment, each base station 220 processes not only PRACH preambles from itself, but also the antennas selection PRACH preambles from neighboring base stations that were exchanged.

In an exemplary embodiment, the top n base station antennas, ranked according to PCQI, are then used as coordinated multipoint antennas in wireless communication with the user equipment 110. In another exemplary embodiment, the top n base station antennas, ranked according to PCQI, are subject to further evaluation or screening to determine whether they will be used as cooperative multipoint antennas.

In at least one non-limiting example, the accuracy of antenna selection may improve as compared to using SRS because of the greater duration of a PRACH waveform, which may typically be greater than 1 millisecond, as compared to 71.4 microseconds for SRS. Further, the coherent energy accumulation for the PRACH waveform may be better than the non-coherent power accumulation for the SRS waveform, enabling the coverage area to extend to neighboring base stations without excessive transmission power.

In another non-limiting example, signaling overhead may be reduced compared to PCQI based on RSRP or SRS because the transmission of PRACH may be controlled by the base station 220 in a one-shot manner. Also, DSP processing requirements may be reduced compared to instantaneous per-TTI antenna selection. Further, in some non-limiting exemplary embodiments, it is possible to provide per-antenna measurement, in comparison to PCQI measurement based on RSRP (which is per-cell based).

Additional exemplary embodiments include the following.

Figure 7:
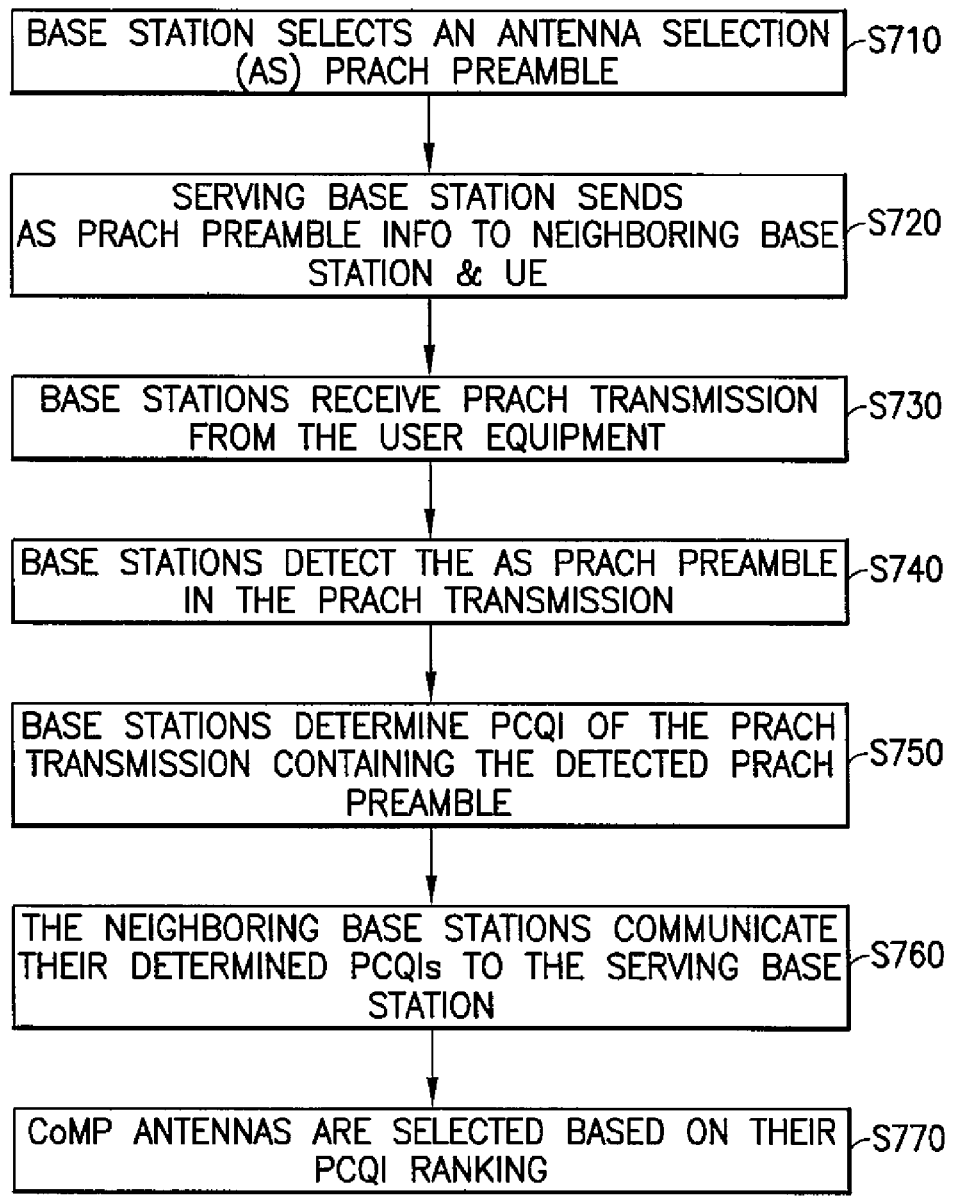
FIG. 7 is a flow chart illustrating an antenna selection method according to an exemplary embodiment.

A method, as illustrated by way of non-limiting example in FIG. 7, which comprises: selecting a physical random access channel (PRACH) preamble (S710); transmitting information regarding the selected PRACH preamble (S720), the transmitted information configured to be receivable by a user equipment; receiving at a first antenna a PRACH transmission transmitted by the user equipment (S730); detecting the selected PRACH preamble in the received PRACH transmission transmitted by the user equipment (S740); determining channel quality information regarding a quality of the detected selected PRACH preamble (S750); and selecting at least one cooperative multipoint antenna from among a plurality of antennas based on the determined channel quality information, the plurality of antennas including at least the first antenna (S760, S770).

The serving cell of the User Equipment may determine appropriate PRACH and RACH configurations, and inform the neighboring cells of the PRACH and RACH configurations through inter-eNB links. The user equipment may transmit the PRACH preamble according to PDCCH order sent by the serving cell. All cells (the serving cell and the neighboring cells) may detect the preamble from all antennas they support, and send the channel quality information, per antenna, to a central location for subsequent antenna selection.

A method, which further comprises communicating information regarding an antenna selection PRACH and RACH configurations of a base station, including the selected PRACH preamble, the communicated information configured to be receivable by at least one neighboring base station; and receiving information regarding an antenna selection PRACH/RACH configuration of the at least one neighboring base station before transmitting the information regarding the selected PRACH preamble.

A method, which further comprises: receiving second channel quality information regarding a quality of the selected PRACH preamble received at an antenna of the at least one neighboring base station, in which the plurality of antennas further includes the antenna of the at least one neighboring base station, and wherein selecting the at least one cooperative multipoint antenna includes comparing the determined channel quality information of the selected PRACH preamble received at the antenna of the at least one neighboring base station.

A method, which further comprises: selecting a size of the selected PRACH preamble corresponding to a distance between the base station and the at least one neighboring base station, in which the selected size is sufficient for both the base station and the at least one neighboring base station to receive the PRACH transmission transmitted by the user equipment.

A method, which further comprises: communicating information regarding a physical downlink control channel signal among the base station and the at least one neighboring base station; transmitting the physical downlink control channel signal to the user equipment; and detecting the selected PRACH preamble transmitted by the user equipment corresponding to the transmitted information regarding the selected PRACH preamble at a second antenna of the base station.

A method, which further comprises: receiving the PRACH transmission at a second antenna, in which a base station includes the first antenna and the second antenna, and wherein the plurality of antennas further includes the second antenna.

A method, which further comprises: selecting a size of the selected PRACH preamble corresponding to a distance between the first antenna and the second antenna, in which the selected size is sufficient for both the first antenna and the second antenna to receive the PRACH transmission transmitted by the user equipment.

A method, in which selecting the at least one cooperative multipoint antenna further comprises: ranking each of the plurality of antennas according to a respective channel quality information; and selecting a predetermined number of cooperative multipoint antennas from the plurality of antennas in descending order of rank.

A method, which further comprises: determining the channel quality information based on a power profile of the detected selected PRACH preamble.

A method, which further comprises: determining the channel quality information based on a signal-to-noise ratio of the detected selected PRACH preamble.

A method, in which selecting the at least one cooperative multipoint antenna is performed at a network controller separate from a base station.

A computer program product 155-1, 195, as shown by way of non-limiting example in FIG. 3, that comprises program code 153-1, 197 for executing any of the preceding methods.

Another computer program product 155-1, 195, as shown by way of non-limiting example in FIG. 3, in which the computer program is a computer program product comprising a computer-readable medium 155-1, 195 bearing computer program code 153-1, 197 embodied therein for use with a computer 150-1.

Figure 8:
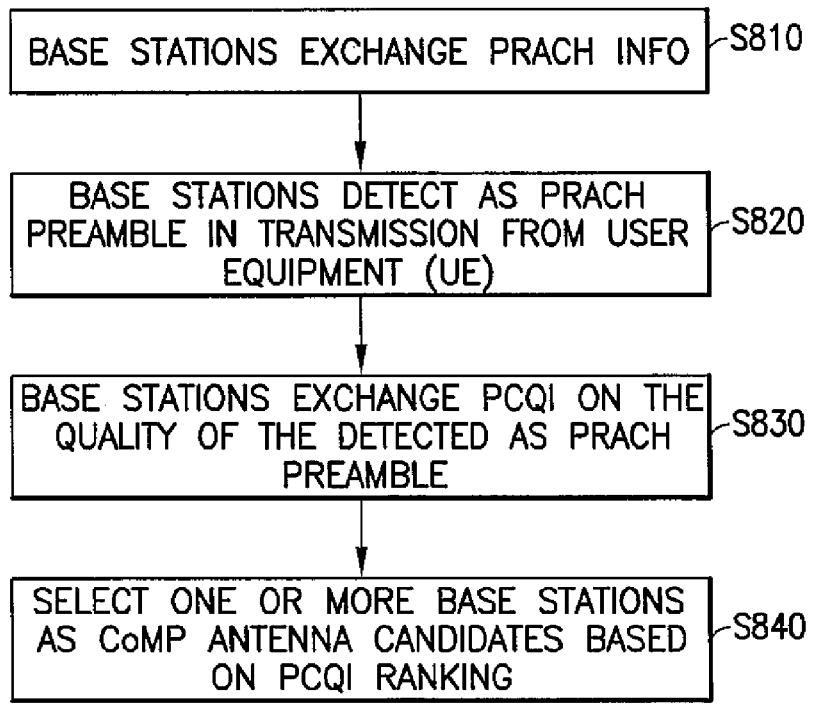
FIG. 8 is a flow chart illustrating an antenna selection method according to another exemplary embodiment.

A method, as illustrated by way of non-limiting example in FIG. 8, which comprises: communicating information regarding an antenna selection physical random access channel (PRACH) configuration of a base station, including a selected PRACH preamble (S810); receiving information regarding an antenna selection PRACH configuration of at least one neighboring base station (S810); detecting the selected PRACH preamble transmitted by the user equipment corresponding to the selected PRACH preamble at an antenna of the base station (S820); and communicating channel quality information regarding a quality of the detected selected PRACH preamble (S830).

A method, as illustrated by way of non-limiting example in FIG. 8, which further comprises: receiving a signal indicating the antenna of the base station is selected as a cooperative multipoint antenna in response to the communicated channel quality information (S840).

A method, which further comprises: selecting a size of the selected PRACH preamble corresponding to a distance between the base station and the at least one neighboring base station, in which the selected size is sufficient for both the base station and the at least one neighboring base station to receive the selected PRACH preamble transmitted by the user equipment.

A method, in which selecting the at least one cooperative multipoint antenna further comprises: ranking each of the plurality of antennas according to a respective channel quality information; and selecting a predetermined number of cooperative multipoint antennas from the plurality of antennas in descending order of rank.

A method, which further comprises: determining the channel quality information based on a power profile of the detected selected PRACH preamble.

A method, which further comprises: determining the channel quality information based on a signal-to-noise ratio of the detected selected PRACH preamble.

A method, which further comprises: communicating information regarding a physical downlink control channel signal among the base station and the at least one neighboring base station; transmitting the physical downlink control channel signal to the user equipment; and detecting the selected PRACH preamble transmitted by the user equipment corresponding to the transmitted information regarding the selected PRACH preamble at a second antenna of the base station.

A computer program product 155-1, 195, as shown by way of non-limiting example in FIG. 3, that comprises program code 153-1, 197 for executing the any of the preceding methods.

Another computer program product 155-1, 195, as shown by way of non-limiting example in FIG. 3, in which the computer program is a computer program product comprising a computer-readable medium 155-1, 195 bearing computer program code 153-1, 197 embodied therein for use with a computer 150-1, 180.

An apparatus 210, 220-1, as shown by way of non-limiting example in FIGS. 3 and 7, which comprises: one or more processors 150-1, 180; and one or more memories 155-1, 195 including computer program code 153-1, 197, the one or more memories 155-1, 195 and the computer program code 153-1, 197 configured, with the one or more processors 150-1, 180, to cause the apparatus 210, 220-1 to perform at least the following: selecting a physical random access channel (PRACH) preamble (S710); transmitting information regarding the selected PRACH preamble (S720), the transmitted information configured to be receivable by a user equipment; receiving at a first antenna a PRACH transmission transmitted by the user equipment (S730); detecting the selected PRACH preamble in the received PRACH transmission transmitted by the user equipment (S740); determining channel quality information regarding a quality of the detected selected PRACH preamble (S750); and selecting at least one cooperative multipoint antenna from among a plurality of antennas based on the determined channel quality information, the plurality of antennas including at least the first antenna (S760, S770).

An apparatus, in which the one or more memories and the computer program code are further configured, with the one or more processors, to cause the apparatus to perform at least the following: communicating information regarding the antenna selection PRACH configuration of a base station, including a selected PRACH preamble, the communicated information configured to be receivable by at least one neighboring base station; and receiving information regarding an antenna selection PRACH configuration of the at least one neighboring base station before transmitting the information regarding the selected PRACH preamble.

An apparatus, in which the one or more memories and the computer program code are further configured, with the one or more processors, to cause the apparatus to perform at least the following: receiving second channel quality information regarding a quality of the selected PRACH preamble received at an antenna of the at least one neighboring base station, in which the plurality of antennas further includes the antenna of the at least one neighboring base station, and wherein selecting the at least one cooperative multipoint antenna includes comparing the determined channel quality information of the selected PRACH preamble received at the antenna of the at least one neighboring base station.

An apparatus, in which the one or more memories and the computer program code are further configured, with the one or more processors, to cause the apparatus to perform at least the following: selecting a size of the selected PRACH preamble corresponding to a distance between the base station and the at least one neighboring base station, in which the selected size is sufficient for both the base station and the at least one neighboring base station to receive the PRACH transmission transmitted by the user equipment.

An apparatus, in which the one or more memories and the computer program code are further configured, with the one or more processors, to cause the apparatus to perform at least the following: communicating information regarding a physical downlink control channel signal among the base station and the at least one neighboring base station; transmitting the physical downlink control channel signal to the user equipment; and detecting the selected PRACH preamble transmitted by the user equipment corresponding to the transmitted information regarding the selected PRACH preamble at a second antenna of the base station.

An apparatus, in which the one or more memories and the computer program code are further configured, with the one or more processors, to cause the apparatus to perform at least the following: receiving the PRACH transmission at a second antenna, in which a base station includes the first antenna and the second antenna, and wherein the plurality of antennas further includes the second antenna.

An apparatus, in which the one or more memories and the computer program code are further configured, with the one or more processors, to cause the apparatus to perform at least the following: selecting a size of the selected PRACH preamble corresponding to a distance between the first antenna and the second antenna, in which the selected size is sufficient for both the first antenna and the second antenna to receive the PRACH transmission transmitted by the user equipment.

An apparatus, in which selecting the at least one cooperative multipoint antenna further comprises: ranking each of the plurality of antennas according to a respective channel quality information; and selecting a predetermined number of cooperative multipoint antennas from the plurality of antennas in descending order of rank.

An apparatus, in which the one or more memories and the computer program code are further configured, with the one or more processors, to cause the apparatus to perform at least the following: determining the channel quality information based on a power profile of the detected selected PRACH preamble.

An apparatus, in which the one or more memories and the computer program code are further configured, with the one or more processors, to cause the apparatus to perform at least the following: determining the channel quality information based on a signal-to-noise ratio of the detected selected PRACH preamble.

An apparatus, in which selecting the at least one cooperative multipoint antenna is performed at a network controller separate from a base station.

An apparatus 210, 220-1, as shown by way of non-limiting example in FIGS. 3 and 8, which comprises: one or more processors 150-1, 180; and one or more memories 155-1, 195 including computer program code 153-1, 197, the one or more memories 155-1, 195 and the computer program code 153-1, 197 configured, with the one or more processors 150-1, 180, to cause the apparatus 210, 220-1 to perform at least the following: communicating information regarding an antenna selection physical random access channel (PRACH) configuration of a base station, including a selected PRACH preamble (S810); receiving information regarding an antenna selection PRACH configuration of at least one neighboring base station (S810); detecting the selected PRACH preamble transmitted by the user equipment corresponding to the selected PRACH preamble at an antenna of the base station (S820); and communicating channel quality information regarding a quality of the detected selected PRACH preamble (S830).

An apparatus, in which the one or more memories and the computer program code are further configured, with the one or more processors, to cause the apparatus to perform at least the following: receiving a signal indicating the antenna of the base station is selected as a cooperative multipoint antenna in response to the communicated channel quality information.

An apparatus, in which the one or more memories and the computer program code are further configured, with the one or more processors, to cause the apparatus to perform at least the following: selecting a size of the selected PRACH preamble corresponding to a distance between the base station and the at least one neighboring base station, in which the selected size is sufficient for both the base station and the at least one neighboring base station to receive the selected PRACH preamble transmitted by the user equipment.

An apparatus, in which selecting the at least one cooperative multipoint antenna further comprises: ranking each of the plurality of antennas according to a respective channel quality information; and selecting a predetermined number of cooperative multipoint antennas from the plurality of antennas in descending order of rank.

An apparatus, in which the one or more memories and the computer program code are further configured, with the one or more processors, to cause the apparatus to perform at least the following: determining the channel quality information based on a power profile of the detected selected PRACH preamble.

An apparatus, in which the one or more memories and the computer program code are further configured, with the one or more processors, to cause the apparatus to perform at least the following: determining the channel quality information based on a signal-to-noise ratio of the detected selected PRACH preamble.

An apparatus, in which the one or more memories and the computer program code are further configured, with the one or more processors, to cause the apparatus to perform at least the following: communicating information regarding a physical downlink control channel signal among the base station and the at least one neighboring base station; wirelessly transmitting the physical downlink control channel signal to the user equipment; and detecting the selected PRACH preamble transmitted by the user equipment corresponding to the transmitted information regarding the selected PRACH preamble at a second antenna of the base station.

An apparatus, comprising: a user equipment configured to communicate wirelessly with the first apparatus.

An apparatus, comprising: a user equipment configured to communicate wirelessly with the twelfth apparatus.

The computer readable memories 155 and 195 may be of any type suitable to the local technical environment and may be implemented using any suitable data storage technology, such as semiconductor based memory devices, flash memory, magnetic memory devices and systems, optical memory devices and systems, fixed memory and removable memory. The processors 150 and 180 may be of any type suitable to the local technical environment, and may include one or more of general purpose computers, special purpose computers, microprocessors, digital signal processors (DSPs) and processors based on a multi-core processor architecture, as non-limiting examples.

Embodiments of the present invention may be implemented in software, hardware, application logic or a combination of software, hardware and application logic. The software, application logic and/or hardware may reside on ROM, RAM, battery-backed RAM, NVRAM, PROM, EPROM or EEPROM, FPGA, fixed or programmable logic array, flash memory, racetrack memory, nano-RAM, millipede, CBRAM, ReRAM, FeRAM, MRAM, phase-change memory, memristor, SONOS, magnetic disk or tape, holograph, optical media, and any combination thereof or other computer-readable storage medium. If desired, part of the software, application logic and/or hardware may reside on a serving base station, part of the software, application logic and/or hardware may reside on a neighboring base station, and part of the software, application logic and/or hardware may reside on a user equipment unit. In an example embodiment, the application logic, software or an instruction set is maintained on any one of various conventional computer-readable media. In the context of this document, a "computer-readable medium" may be any media, storage technology or article of manufacture that can contain, store, communicate, propagate or transport the instructions for use by or in connection with an instruction execution system, apparatus, or device, such as a computer, with one example of a computer described and depicted in FIG. 3. A computer-readable medium may comprise a computer-readable storage medium that may be any media or means that can contain or store the instructions for use by or in connection with an instruction execution system, apparatus, or device, such as a computer. In accordance with at least one non-limiting example, a computer-readable medium may include any media, storage technology or article of manufacture capable of non-transitory, tangible storage of computer program code and/or data.

In a non-limiting exemplary embodiment, the serving base station may include any base station with which the user equipment communicates as the primary base station of the user equipment.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

In Uplink CoMP, the uplink transmission from a UE is received from multiple geographically separated antennas. By pooling the multiple antenna signals together, and by the joint reception, one can take advantage of the macro diversity, exploit the interference, and enhance the UE throughput; especially at a cell edge.

However, due to the fact that pathloss (e.g., a UE's distance to antenna) and noise/interference condition are different at each antenna for this particular UE, there is a need to select a subset of antennas from the antenna pool for joint processing. There is a need to develop an antenna selection scheme which (1) can provides pathloss information and signal quality information for antenna selection, (2) can identify individual antenna branch, (3) can be received by antennas in the vicinity without excessive transmit power, and (4) requires low signaling overhead.

Features as described herein may be used for an antenna selection scheme based on the random access channel and coordinated processing across cells.

In a LTE network for example, each cell configures dedicated PRACH resource(s) for antenna selection (abbreviated to "AS") in UL CoMP. The RACH parameters are chosen such that the PRACH link budget exceeds what is typically required for a single cell operation so the neighboring cells are in the coverage of the PRACH signal (i.e. they can detect the PRACH transmission from a UE reliably).

Each cell may send its PRACH and RACH configurations, and along with the dedicated PRACH configuration, to its neighbor cells. The size of dedicated PRACH preambles is chosen so the need for antenna selection is satisfied along with other usages for RACH. At the order of PDCCH/ePDCCH, a UE transmits the prescribed preamble on the PRACH opportunity.

At each cell, a PRACH detector detects the preambles from this UE. The quality (in terms of SNR or power profile) fox each detected preamble index at each antenna branch of each neighbor cell may be sent to the serving cell. If the PDCCH/ePDCCH order information is shared among the serving cell and neighbor cells, a more targeted estimate at each cell can be conducted on a per-antenna basis.

At the serving cell (or Base-Band Unit (BBU)), the received signals at different antennas from all cells may be ranked according to signal strength and/or SNR. The top M winners of those antennas may be selected for joint processing. They may undergo further choice of the optimal aperture size.

In a LTE network, each cell configures RACH resource(s) for antenna selection in UL CoMP. The configured resource may or may not share the same resource pool as RACH configured for other purposes (legacy use). The configured RACH resource(s) may overlap with PUSCH/PUCCH transmission to share the resource in a CDMA fashion to save resources. The PRACH format for AS may be chosen with the hearability requirement at neighbor cells. For example, for site-to-site distance at 500 m, typically PRACH format 0 is adequate; yet to provide better hearability at neighbor cells, PRACH format 2 is chosen. The targeted received power for PRACH (Po) may also be set with the hearability at neighbor cells in mind. Each cell may send its PRACH configuration and, along with the numberOfRA-Preambles, in RACH-ConfigCommon configuration to its neighbors. At the order of PDCCH/ePDCCH, a UE may transmit the prescribed preamble on the PRACH opportunity for AS which may overlap with PUSCH/PUCCH. Each cell may be configured to process, not only the PRACH preambles from itself, but also dedicated RACH preambles from neighbor cells. The large processing gain of PRACH (i.e. 839) can be exploited to detect multiple preambles from different UEs at the same time.

At each cell, a PRACH detector may detect the preambles from that UE. The quality (in terms of SNR or power profile) for each detected preamble index at each antenna at neighbor cells may be sent to the serving cell. If the PDCCH/ePDCCH order information is shared among cells, then a more targeted estimate at each cell can be conducted at each antenna. Cells involved in the AS of a group of UEs can also coordinate the configuration of the PRACH resources in time, frequency, and preamble index, so the additional signal processing load on FPGA/DSP due to AS is distributed in a way that the peak MIPS/resource requirement does not impact the current design in a substantial way.

Regarding RACH operation, note here that the term "broadcast" is always from an eNB to UEs in the coverage area. A UE just reads the BCH (Broadcast channel) from the eNB (so the eNB does not even have to know the existence of that UE). The eNB in an adjacent cell does not listen to the broadcast of the eNB at the cell of interest.

1) The RACH parameters, such as when and where the RACH resources are configured in the LTE system, are broadcasted by the eNB; (e.g. in every subframe 1 of a radio frame, starting from PRB 44 to PRB 49 (occupying 6 PRBs));
2) How the PRACH signal is generated is also broadcasted by the LTE system (the preamble root index for the first preamble, the PRACH format, 0, 1, 2, 3, 4), and the zero-correlation window size;
3) The initial targeted received power of the PRACH preamble is also broadcasted;
4) The power ramp-up step in the RACH procedure is also broadcasted. The preamble indices are divided into two pools:
   one for non-dedicated RACH (mostly initial random access. For example, if the pool size is 40, then a UE randomly selects a number between 0-39, and the preamble with the selected preamble index will be used for RACH), and dedicated RACH (the eNB directly tells a UE the preamble index to use through PDCCH (downlink control channel)). The partition of the total PRACH preambles (in total 64 for any RACH opportunity in FDD) into non-dedicated and dedicated preamble pools is also broadcasted by an eNB to UEs in BCH. So we have;

5) The partition of dedicated and non-dedicated RACH pools.

If it is for non-dedicated RACH, then a UE only acquires the system information from BCH, and that is enough for the UE. For dedicated RACH, a UE acquires the above listed configuration information from BCH from eNB and, in addition, the UE is instructed by its eNB in PDCCH to perform RACH at a pre-chosen preamble. So to accomplish the dedicated RACH, two parts of information are needed, one part from BCH, another part (i.e. the subframe for the UE to send RACH, and the PRACH preamble the UE should use) comes from PDCCH.

Regarding the inter-eNB link, also in a UL CoMP scheme, typically we assume some inter-eNB links, the physical implementation of those links can be through fiber, microwave link, or wireline. It is sufficient to say we rely on those links among eNB to facilitate the exchange of RACH and PRACH configuration information (as the two parts listed above), and is not limited to a specific case how that information is carried, wired or wireless. The inter-eNB link may be by a different medium from the air interface between eNB and UE.

Regarding PRACH detection operation details, for dedicated RACH the eNB knows everything the instructed UE will do, and it can detect the incoming PRACH preamble as it has specified that to the UE. For other eNBs (say eNB 2 and eNB 3) to perform the same operation, then it is necessary for eNB to send eNB 1's RACH and PRACH configurations which are essential for PRACH detection (i.e. 1), 2) and 5) as listed above are needed for PRACH detection at eNB 2 and eNB3); and the chosen preamble for dedicated RACH to eNB 2 and eNB 3. Those two parts of information are sent from eNB1 to eNB2 and eNB 3 through the inter-eNB links. As the first part of information typically does not change, so only the second part of information needs to updated from subframe to subframe. From eNB 2 and eNB 3's points of view, they already know from the first part of the information, dedicated RACH at eNB 1 uses preambles {d1, d2, d3, . . . d8} (we use 8 dedicated PRACH preamble as example), and now eNB 1 informs eNB 2 and eNB 3 through the inter-eNB links that in subframe n, they should detect on preamble d3 for example.

Consider several variants of the above scheme:

eNB 1 can determine how many preambles are needed for the purpose to select RX antennas (let us say it finds 3 preambles are enough), then eNB 1 informs eNB 2 and eNB 3 through the inter-eNB links that 3 preambles are used for the purpose to select RX antennas, and they are d4, d6, d7. Through this, then at the each RACH opportunity on eNB 1, eNB2 and eNB 3 just blindly detect d4, d6 and d7 and then send the detection information back to eNB 1. They benefit of this variant is that there is no need for eNB 1 to inform eNB 2 or eNB 3 about the instantaneous decision it takes on the selected PRACH preamble.

This description shows that by configuring 2), 3) and 4) properly, the signal from a UE associated with eNB 1 can be heard by eNB 2 and eNB 3. By exploiting the huge spreading gain of the PRACH signal, then antenna selection can be done reliably.

With features as described herein, the UE may transmits only one PRACH preamble, and each of the neighboring cells then detects that one transmitted PRACH preamble. This statement is precise from a specific UE's perspective. From a cell's perspective, please note there may be two options in coordinated process among cells:

1. If there is a tight coordination of the PRACH among cells, then the serving cell may inform the neighboring cells of the PRACH preamble the serving cell is going to ask some UE to transmit; and the neighboring cells may detect that PRACH preamble. As logically it is possible multiple UEs are asked to transmit preambles at the same time (even though the chance is small), in practice from option 1, a neighbor cell can be informed explicitly by the serving cell during to detect preambles 60, 61 in subframe n, and to detect preambles 61, 62 in subframe n+1;

2. In another option, the serving cell does not inform the PRACH preamble it is going to ask some UE to transmit to neighboring cells. Rather the PRACH preamble is selected from a pre-configured set (for example, preambles with index 60, 61, 62), and the serving cell only informs the neighboring cells of the pre-configured set. In this case, each neighbor cell detects all preambles in the pre-configured set. Then, a neighbor cell detects preambles 60, 61, 62 all the time (for subframes n, n+1, n+2, . . . ).

The benefits of features as described herein include:

The duration of PRACH waveform (>=1 ms) provides much better hearability than SRS (71.4 microseconds). This improves the accuracy of the antenna selection.

Coherent energy accumulation for the PRACH waveform is better than the non-coherent power accumulation for the SRS waveform. This, thus, extends the coverage area to the neighboring cells without requiring excessive transmit power.

The transmission of PRACH may be controlled by the eNB in an one-shot transmission fashion. There is very little signaling overhead than RSRP or SRS based solution.

This method also avoids the drawback in instantaneous per TTI antenna selection by not requiring excessive DSP processing, and provides more reliable antenna selections results for cell edge UEs that have few RB allocations.

Compared with RSRP based solution, features as described herein enable per-antenna measurement as opposed to RSRP measurement report (per cell based).

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
selecting at a first base station multiple ones of a plurality of antennas for a coordinated multipoint communication by the first base station and one or more neighboring base stations with a user equipment, the selecting performed by the first base station and comprising:
selecting a physical random access channel (PRACH) preamble to be used by the user equipment in an antenna selection PRACH process;

communicating information to be used in the antenna selection PRACH process and regarding a physical random access channel (PRACH) configuration of the first base station, including the selected PRACH preamble, toward the one or more neighboring base stations;

receiving information to be used in the antenna selection PRACH process and regarding a PRACH configuration of the one or more neighboring base stations before transmitting information regarding the selected PRACH preamble toward the user equipment;

transmitting information regarding the selected PRACH preamble toward the user equipment for use in a subsequent PRACH transmission, as part of the antenna selection PRACH process, by the user equipment toward the first base station and the one or more neighboring base stations;

receiving at a first antenna of the plurality of antennas the subsequent PRACH transmission transmitted by the user equipment;

detecting the selected PRACH preamble in the received PRACH transmission transmitted by the user equipment;

determining channel quality information regarding a quality of the detected PRACH preamble and regarding quality information received from the one or more neighboring base stations and based on the PRACH transmission by the user equipment and to the one or more neighboring base stations; and selecting the multiple antennas from among the plurality of antennas based on the determined channel quality information, the plurality of antennas including at least the first antenna; and performing, using at least one of the selected multiple antennas, the coordinated multipoint communication by the first base station with the user equipment.

2. The method of claim 1, wherein:
the method further comprises receiving the quality information as second channel quality information regarding a quality of the selected PRACH preamble received at one or more antennas of the at least one neighboring base station,
the plurality of antennas further includes the one or more antennas of the at least one neighboring base station, and
selecting the multiple antennas from among the plurality of antennas includes comparing the determined channel quality information of the selected PRACH preamble received at the one or more antennas of the at least one neighboring base station.

3. The method of claim 1, wherein selecting the multiple antennas from among the plurality of antennas further comprises:
ranking each of the plurality of antennas according to a respective channel quality information; and
selecting a predetermined number of the plurality of antennas from the plurality of antennas in descending order of rank.

4. The method of claim 1, further comprising determining the channel quality information based on:
a power profile of the detected selected PRACH preamble; or
a signal-to-noise ratio of the detected selected PRACH preamble.

5. A computer program product comprising a non-transitory computer-readable medium having program code thereon, the program code configured to cause an apparatus to perform the method according to claim 1, in response to execution of the program code by the apparatus.

6. A method, comprising:
selecting a physical random access channel (PRACH) preamble;
transmitting information regarding the selected PRACH preamble, the transmitted information configured to be receivable by a user equipment;
receiving at a first antenna a PRACH transmission transmitted by the user equipment;
detecting the selected PRACH preamble in the received PRACH transmission transmitted by the user equipment;
determining channel quality information regarding a quality of the detected PRACH preamble;
selecting at least one cooperative multipoint antenna from among a plurality of antennas based on the determined channel quality information, the plurality of antennas including at least the first antenna;
selecting a size of the selected PRACH preamble corresponding to a distance between the base station and the at least one neighboring base station,
wherein the selected size allows both the base station and the at least one neighboring base station to receive the PRACH transmission transmitted by the user equipment.

7. An apparatus comprising:
one or more processors; and
one or more memories including computer program code,
the one or more memories and the computer program code configured, with the one or more processors, to cause the apparatus to perform at least the following:
selecting at a first base station multiple ones of a plurality of antennas for a coordinated multipoint communication by the first base station and one or more neighboring base stations with a user equipment, the selecting performed by the first base station and comprising:
selecting a physical random access channel (PRACH) preamble to be used by the user equipment in an antenna selection PRACH process;
communicating information to be used in the antenna selection PRACH process and regarding a physical random access channel (PRACH) configuration of the first base station, including the selected PRACH preamble, toward the one or more neighboring base stations;
receiving information to be used in the antenna selection PRACH process and regarding a PRACH configuration of the one or more neighboring base stations before transmitting information regarding the selected PRACH preamble toward the user equipment;
transmitting information regarding the selected PRACH preamble toward the user equipment, for use in a subsequent PRACH transmission, as part of the antenna selection PRACH process, by the user equipment toward the first base station and the one or more neighboring base stations;
receiving at a first antenna of the plurality of antennas the subsequent PRACH transmission transmitted by the user equipment;
detecting the selected PRACH preamble in the received PRACH transmission transmitted by the user equipment;
determining channel quality information regarding a quality of the detected selected PRACH preamble and regarding quality information received from the one or more neighboring base stations and based on the PRACH transmission by the user equipment and to the one or more neighboring base stations; and selecting the multiple antennas from among the plurality of antennas based on the determined channel quality information, the plurality of antennas including at least the first antenna; and performing, using at least one of the selected multiple antennas, the coordinated multipoint communication by the first base station with the user equipment.

8. The apparatus of claim 7, wherein:

the one or more memories and the computer program code are further configured, with the one or more processors, to cause the apparatus to perform at least the following: receiving the quality information as second channel quality information regarding a quality of the selected PRACH preamble received at one or more antennas of the at least one neighboring base station, wherein the plurality of antennas further includes the one or more antennas of the at least one neighboring base station, and wherein selecting the multiple antennas from among the plurality of antennas includes comparing the determined channel quality information of the selected PRACH preamble received at the antenna of the at least one neighboring base station.

9. The apparatus of claim 8, wherein selecting the multiple antennas from among the plurality of antennas further comprises:

ranking each of the plurality of antennas according to a respective channel quality information; and selecting a predetermined number of cooperative multipoint antennas from the plurality of antennas in descending order of rank.

10. The apparatus of claim 7, wherein the one or more memories and the computer program code are further configured, with the one or more processors, to cause the apparatus to perform at least the following:

determining the channel quality information based on a power profile of the detected selected PRACH preamble.

11. The apparatus of claim 7, wherein the one or more memories and the computer program code are further configured, with the one or more processors, to cause the apparatus to perform at least the following:

determining the channel quality information based on a signal-to-noise ratio of the detected selected PRACH preamble.

12. An apparatus, comprising:

one or more processors; and one or more memories including computer program code, wherein the one or more memories and the computer program code are configured, with the one or more processors, to cause the apparatus to perform at least the following:

selecting a physical random access channel (PRACH) preamble;

transmitting information regarding the selected PRACH preamble, the transmitted information configured to be receivable by a user equipment;

receiving at a first antenna a PRACH transmission transmitted by the user equipment;

detecting the selected PRACH preamble in the received PRACH transmission transmitted by the user equipment;

determining channel quality information regarding a quality of the detected PRACH preamble;

selecting at least one cooperative multipoint antenna from among a plurality of antennas based on the determined channel quality information, the plurality of antennas including at least the first antenna;

selecting a size of the selected PRACH preamble corresponding to a distance between the base station and the at least one neighboring base station, wherein the selected size is sufficient for both the base station and the at least one neighboring base station to receive the PRACH transmission transmitted by the user equipment.

* * * * *